(12) United States Patent
Nordbruch

(10) Patent No.: US 10,336,384 B2
(45) Date of Patent: Jul. 2, 2019

(54) METHOD FOR OPERATING A VEHICLE AND FOR OPERATING A MANUFACTURING SYSTEM

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 126 days.

(21) Appl. No.: 15/524,337

(22) PCT Filed: Oct. 22, 2015

(86) PCT No.: PCT/EP2015/074455
§ 371 (c)(1),
(2) Date: May 4, 2017

(87) PCT Pub. No.: WO2016/083029
PCT Pub. Date: Jun. 2, 2016

(65) Prior Publication Data
US 2017/0320529 A1    Nov. 9, 2017

(30) Foreign Application Priority Data
Nov. 26, 2014   (DE) .................. 10 2014 224 082

(51) Int. Cl.
*B62D 65/18* (2006.01)
*G06Q 50/04* (2012.01)
*G05D 1/02* (2006.01)

(52) U.S. Cl.
CPC ........... *B62D 65/18* (2013.01); *G05D 1/0212* (2013.01); *G06Q 50/04* (2013.01); *G05D 2201/0213* (2013.01); *Y02P 90/30* (2015.11)

(58) Field of Classification Search
CPC ............... B62D 65/18; G05D 1/0212; G05D 2201/0213; G06Q 50/04; Y02P 90/30
USPC ......................................................... 701/1, 2
See application file for complete search history.

(56) References Cited

U.S. PATENT DOCUMENTS

| | | | | |
|---|---|---|---|---|
| 4,941,407 A * | 7/1990 | Pigott | ................... | B60L 13/006 104/289 |
| 5,469,356 A * | 11/1995 | Hawkins | ................ | G01C 21/26 318/591 |
| 6,370,452 B1 * | 4/2002 | Pfister | .................. | G05D 1/0297 701/23 |
| 8,274,648 B2 * | 9/2012 | Corghi | ............... | G01B 11/2755 356/139.09 |

(Continued)

FOREIGN PATENT DOCUMENTS

| | | |
|---|---|---|
| DE | 102009022281 A1 | 3/2010 |
| DE | 102011109346 A1 | 3/2012 |

(Continued)

OTHER PUBLICATIONS

International Search Report dated Jan. 21, 2016, of the corresponding International Application PCT/EP2015/074455 filed Oct. 22, 2015.

*Primary Examiner* — Jaime Figueroa
(74) *Attorney, Agent, or Firm* — Norton Rose Fulbright US LLP; Gerard Messina

(57) ABSTRACT

A method for operating a vehicle, the vehicle driving autonomously or remotely controlled within a manufacturing system for manufacturing vehicles.

6 Claims, 1 Drawing Sheet

(56) References Cited

U.S. PATENT DOCUMENTS

| | | | | |
|---|---|---|---|---|
| 8,793,036 B2* | 7/2014 | Koon | ............... | G05D 1/0278 701/1 |
| 2005/0247513 A1* | 11/2005 | Turner | ............... | B62D 1/286 180/444 |
| 2006/0184013 A1* | 8/2006 | Emanuel | ............... | G01S 5/16 600/426 |
| 2008/0051984 A1* | 2/2008 | Wurman | ............... | G06Q 10/08 701/532 |
| 2009/0088894 A1* | 4/2009 | Tanemori | ............... | G06Q 10/08 700/225 |
| 2011/0010023 A1* | 1/2011 | Kunzig | ............... | G01S 5/16 701/2 |
| 2012/0072051 A1* | 3/2012 | Koon | ............... | G05D 1/0278 701/2 |
| 2012/0215355 A1* | 8/2012 | Bewley | ............... | B25J 5/005 700/258 |
| 2013/0325159 A1* | 12/2013 | Kilibarda | ............... | G05B 15/02 700/114 |
| 2013/0325210 A1* | 12/2013 | Palm | ............... | G05D 1/0289 701/2 |
| 2013/0336537 A1* | 12/2013 | Reeves | ............... | G05D 1/0246 382/104 |
| 2013/0338854 A1* | 12/2013 | Yamamoto | ............... | G05D 1/0011 701/2 |
| 2014/0062384 A1* | 3/2014 | Niizuma | ............... | B60L 5/005 320/104 |
| 2014/0082918 A1* | 3/2014 | Grevener | ............... | B62D 25/2009 29/469 |
| 2015/0063960 A1* | 3/2015 | Smid | ............... | G05D 1/0225 414/401 |
| 2015/0128719 A1* | 5/2015 | Kilibarda | ............... | B23P 21/004 73/850 |

FOREIGN PATENT DOCUMENTS

| | | | |
|---|---|---|---|
| DE | 102011108662 A1 * | 1/2013 | ......... G01M 17/007 |
| DE | 102011108662 A1 | 1/2013 | |
| DE | 102011109597 A1 | 2/2013 | |
| DE | 102012008777 A1 | 10/2013 | |
| DE | 102012016519 A1 | 2/2014 | |
| DE | 102012222562 A1 | 6/2014 | |
| DE | 102012223057 A1 | 6/2014 | |
| DE | 102013000569 A1 | 7/2014 | |

* cited by examiner

METHOD FOR OPERATING A VEHICLE AND FOR OPERATING A MANUFACTURING SYSTEM

FIELD

The present invention relates to a method for operating a vehicle, to a vehicle, to a manufacturing system for manufacturing vehicles, to a method for operating a manufacturing system for manufacturing vehicles as well as to a computer program.

BACKGROUND INFORMATION

German Patent Application No. DE 10 2012 222 562 A1 describes a system for managed parking facilities for a transfer of a vehicle from a start position into a target position.

In the case of manufacturing systems for manufacturing vehicles, it is customary that the vehicles are conveyed from one assembly station to the next assembly station on an assembly line. At the end of the assembly line, a driver drives the vehicle manually to a parking space.

SUMMARY

An object of the present invention is to provide a method for operating a vehicle with the aid of which a manufacturing system for manufacturing vehicles may be operated efficiently.

An object of the present invention is to provide a corresponding vehicle, a corresponding manufacturing system for manufacturing vehicles, a corresponding method for operating a manufacturing system as well as a computer program.

Advantageous embodiments of the present invention are described herein.

According to one aspect of the present invention, a method for operating a vehicle is provided, the vehicle driving autonomously or remotely controlled within a manufacturing system for manufacturing vehicles.

According to yet another aspect, a vehicle is provided which is configured to carry out the method for operating a vehicle.

According to yet another aspect, a method for operating a manufacturing system for manufacturing vehicles is provided, a vehicle carrying out the method for operating a vehicle with the aid of the manufacturing system within the scope of its manufacture.

According to yet another aspect, a manufacturing system for manufacturing vehicles is provided which is configured to carry out the method for operating a manufacturing system for manufacturing vehicles.

According to another aspect, a computer program is provided which includes program codes for carrying out the method for operating a vehicle and/or for operating a manufacturing system for manufacturing vehicles, when the computer program is executed on a computer.

The present invention thus includes in particular the idea of driving a vehicle autonomously or remotely controlled within a manufacturing system. This therefore means that it is no longer necessary to drive the vehicle manually with the aid of a driver. Valuable resources are thus freed up for the manufacturing system. The autonomous or remotely controlled driving may furthermore result in time being saved. A driver no longer has to get in the car and get out of the car after parking the vehicle. This getting into the car and getting out of the car takes the driver time. Furthermore, it is thus advantageously possible to check the operability of the vehicle with regard to an autonomous or remotely controlled driving operation still within the manufacturing system in order to be able to remedy potential malfunctions still within the manufacturing system. This translates to a lot less effort as compared to the situation in which a malfunction is not determined until outside of the manufacturing system, e.g., by the end customer.

Moreover, a vehicle may move autonomously or remotely controlled more flexibly within the manufacturing system. For the purpose of moving the vehicle within the manufacturing system the use of a conveyor belt, which cannot be changed subsequently with regard to its geometry, is now no longer necessary. The manufacturing system may thus be constructed flexibly in general. In particular, conveyor belts may be dispensed with.

According to the present invention, a concept is therefore provided with the aid of which a manufacturing system may be operated efficiently and cost-effectively.

Within the meaning of the present invention, autonomously means in particular that the vehicle navigates or drives autonomously, i.e., without a driver's intervention, or is guided remotely controlled within the manufacturing system, in particular in a parking facility. The vehicle thus drives autonomously in the parking facility without a driver having to control the vehicle for this purpose. A guidance includes in particular a transverse guidance and/or a longitudinal guidance of the vehicle. This type of an autonomously driving vehicle, which in addition is also capable of parking and unparking automatically, is referred to as an AVP vehicle, for example. AVP stands for "automatic valet parking" and may be referred to as an "automatic parking process". Vehicles which do not have this AVP functionality are referred to as normal vehicles, for example.

A parking facility within the meaning of the present invention may also be referred to as a parking area and functions as a parking area for vehicles. The parking facility thus forms in particular a contiguous area that has multiple parking spaces (with respect to a parking facility on private property) or parking positions (with respect to a parking facility on public property). The parking facility may include a parking deck according to one specific embodiment. In particular, the parking facility includes a parking garage.

A parking position within the meaning of the present invention is a position in which the vehicle is to park autonomously.

In another specific embodiment, it is provided that the vehicle parks in the parking position autonomously or parks remotely controlled.

In another specific embodiment, it is provided that the vehicle unparks from the parking position autonomously or unparks remotely controlled.

According to another specific embodiment, it is provided that the manufacturing system includes an assembly line for vehicle manufacturing.

According to one specific embodiment, the assembly line includes a spatial sequence of assembly stations on which manufacturing steps are sequentially carried out on the vehicle to be manufactured.

In another specific embodiment, the manufacturing system includes a parking facility.

In one specific embodiment it is provided that the manufacturing system includes an assembly line for vehicle manufacturing and a parking facility, the vehicle driving to the parking facility at the end of the assembly line and parking in the parking facility. Thus, this yields the technical advantage in particular that it is possible to check directly and immediately after the completion of the vehicle whether the vehicle has correctly implemented an AVP (automatic valet parking) function. This therefore means that it is possible to check or that it is checked whether the AVP functionality of the vehicle is operational. In particular, thanks to the autonomous or remotely controlled driving from the end of the assembly line to the parking facility, it is no longer necessary to provide a human driver to carry out this task. This may save resources and time.

According to another specific embodiment, it is provided that the manufacturing system includes an assembly line for vehicle manufacturing, the vehicle driving from one assembly station to another assembly station of the assembly line. This yields the technical advantage in particular that it is no longer necessary to use a conveyor belt to move the vehicle from one assembly station to the next. Costs may also advantageously be reduced in this way. Maintenance expenditures for assembly or conveyor belts may, in particular, be reduced in this way. An AVP functionality of the vehicle may also in particular be tested here. It may be tested, in particular, whether the vehicle drives correctly autonomously or remotely controlled.

In one specific embodiment, it is provided that during its driving operation, the vehicle drives to one or multiple test facility(ies) for the purpose of one or multiple vehicle test(s) being carried out. This yields the technical advantage in particular that the vehicle may be efficiently tested since there is no need to provide a human driver for a driving operation to the test facilities in this case either. The vehicle drives autonomously or remotely controlled to the one test facility or to the multiple test facilities.

According to one specific embodiment, the one test facility or the multiple test facilities is/are designed to carry out at least one or multiple of the following test(s): Dent test, paint test, lighting test of a vehicle lighting.

According to another specific embodiment, it is provided that the driving operation of the vehicle is monitored and/or documented at least partially, in particular completely, with the aid of a vehicle-external monitoring system. This yields the technical advantage in particular that even after a driving operation is completed the driving operation may be retraced. In particular, it is, for example, possible to retrace errors or malfunctions which occurred during the driving operation. The monitoring yields the technical advantage in particular that in the case of an error or a malfunction of the vehicle, it is possible to intervene directly and immediately before any damage may occur. Documenting the driving operation includes in particular a visual recording, a recording in general, of the driving operation.

According to one specific embodiment, it is provided that vehicle-internal vehicle data, which are generated during the driving operation, are monitored and/or documented. This yields the same technical advantages in particular as were explained in conjunction with the monitoring or the documentation of the driving operation of the vehicle.

According to one specific embodiment, the vehicle-internal vehicle data are stored in the vehicle itself, in a vehicle-internal memory, for example.

According to one specific embodiment, the stored vehicle-internal vehicle data are read out from the vehicle-internal memory during and/or after the driving operation.

According to another specific embodiment it is provided additionally or alternatively thereto that the vehicle-internal vehicle data, which are generated during the driving operation, are sent or transmitted to a server via a communication network. A server of this type may, for example, advantageously evaluate the vehicle-internal vehicle data. For this purpose, the server, for example, includes a processor which is designed to evaluate the vehicle-internal vehicle data. According to one specific embodiment, the server is included in the manufacturing system. This means that the vehicle-internal data are sent via the communication network to the manufacturing system.

According to one specific embodiment, the communication network includes a WLAN and/or a mobile communication network.

According to one specific embodiment, a communication is or is going to be encrypted via the communication network.

According to one specific embodiment, the monitoring system includes one or multiple video camera(s) and/or one or multiple radar sensor(s) and/or one or multiple ultrasonic sensor(s) and/or one or multiple LIDAR sensor(s) and/or one or multiple laser sensor(s) and/or one or multiple photoelectric barrier(s)) and/or one or multiple door opening sensor(s).

According to one specific embodiment, the vehicle includes surroundings sensor system for detecting the surroundings of a vehicle. The surroundings sensor system preferably includes one or multiple of the following surroundings sensor(s): radar sensor, LIDAR sensor, ultrasonic sensor, video sensor, and laser sensor.

According to one specific embodiment, the vehicle includes a communication interface which is designed to communicate with one or multiple user (s) of a communication network. The communication interface is, for example, designed to send data, in particular vehicle-internal vehicle data, to the user(s) via the communication network. In particular, the communication interface is designed to receive data, for example control instructions, via the communication network. According to one specific embodiment, the manufacturing system is thus configured to remotely control the vehicle. This is accomplished via control instructions.

A user of the communication network is, for example, the manufacturing system for manufacturing vehicles.

According to another specific embodiment, the manufacturing system includes a communication interface which is designed to communicate with one or multiple user(s) of the communication network. In this case, a user of the communication network is the vehicle, for example.

According to another specific embodiment, it is provided that the vehicle receives data which are relevant for the autonomous driving operation and based on which the vehicle drives autonomously within the manufacturing system. This yields the technical advantage in particular that an efficient autonomous driving operation of the vehicle is made possible on or within the manufacturing system. The vehicle has received data which are relevant for this purpose. These relevant data are sent to the vehicle with the aid of the manufacturing system, for example.

The data which are relevant for the autonomous driving operation are, for example, the following data, individually or in combination: map data from a digital map, position data about one or multiple stationary object(s) which is/are located within the manufacturing system, position data about one or multiple mobile object (s) which is/are located within the manufacturing system, prediction data with regard to a future movement of one or multiple of the mobile object(s) which is/are located within the manufacturing system, target position data for one or multiple target(s) which the vehicle is supposed to drive to autonomously. A target of this type is, for example, a position or a location of an assembly station, a test facility, or an end of the assembly line or a parking facility or a parking position in a parking facility.

The data which are relevant for the autonomous driving operation are preferably received by the vehicle or sent to the vehicle, e.g., with the aid of the manufacturing system, via the communication network. This means that the manufacturing system sends these data to the vehicle.

In another specific embodiment, it is provided that one or multiple remote-control instruction(s) or control instruction(s) for remotely controlled driving is/are received by the vehicle, the vehicle driving correspondingly remotely controlled in response to the remote-control instruction(s) (also referred to as control instruction(s)). The receiving may also be carried out via the communication network, for example. This therefore means that the vehicle receives one or multiple remote-control instruction(s) via the communication network. This (these) remote-control instruction (s) is/are sent to the vehicle via the communication network. The vehicle is thus driven based on the remote-control instructions. This specific embodiment yields the advantage in particular that there is no need for the vehicle itself to have any knowledge about the manufacturing system, in particular about a topography of the manufacturing system. For example, there is no need for the vehicle to know where mobile or stationary objects are located within the manufacturing system. Neither is there a need for the vehicle to ascertain for itself a setpoint trajectory to be followed. All knowledge may remain vehicle-external, e.g., the manufacturing system has this knowledge. It is only specified to the vehicle where and how it has to drive, i.e., at what velocity, for example. In particular, there is no need for the vehicle to have a digital map of the manufacturing system. In this way, there is no need to create a digital map for the vehicle, which generally requires a lot of effort, resulting in time, costs, and resources being saved.

In another specific embodiment, it is provided that the vehicle orients itself towards a vehicle-external navigation infrastructure during its driving operation.

A navigation infrastructure includes, for example, one or multiple signal transmitter(s), e.g., light signal transmitter (s), visual landmarks, for example. This is similar to a lighthouse or a light signal with which the vehicle orients itself while moving within the manufacturing system. A navigation infrastructure includes, for example, one or multiple radio transmitter(s), for example a WLAN transmitter. This is also similar to a lighthouse. The vehicle thus, in particular, follows the light signals and/or the radio signals, e.g., the WLAN signals. This following yields in particular that the vehicle is able to move to one or multiple target position(s). This therefore means that the vehicle is able to reach or reaches the one or the multiple target position(s) by following the signals.

This advantageously facilitates an improved navigation of the vehicle within the manufacturing system.

According to one specific embodiment, a route of the vehicle is blocked to people or other vehicles. This therefore means that the route of the vehicle, at least sections of the route, is/are blocked. A blocking may take place with the aid of one or multiple barrier(s), for example. In particular signal systems, in particular light signal systems, may be controlled in such a way that they emit red or green signals for the purpose of blocking or unblocking the route, in particular sections of the route. This therefore means that preferably a route from an end of the conveyor belt, i.e., an end of an assembly line, to the parking facility is particularly secured. According to one specific embodiment, this route is preferably devoid of people.

Specific embodiments with regard to the methods result analogously from the corresponding specific embodiments with regard to the vehicle and the manufacturing system and vice versa. This therefore means that device or system features or vehicle features result from the corresponding features of the method and vice versa.

The present invention is explained below in greater detail with reference to preferred exemplary embodiments.

DETAILED DESCRIPTION OF EXAMPLE EMBODIMENTS

Figure 1:
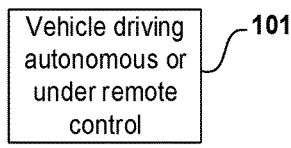
FIG. 1 shows a step of a vehicle driving.

FIG. 1 shows a flow chart of a method for operating a vehicle.

According to a step 101 it is provided that the vehicle drives autonomously or remotely controlled within a manufacturing system for manufacturing vehicles.

Figure 2:
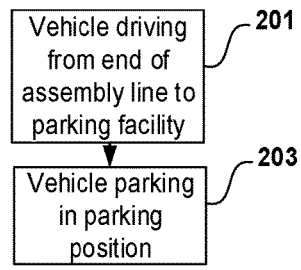
FIG. 2 shows a flow chart of a method for operating a vehicle.

FIG. 2 shows a flow chart of a further method for operating a vehicle.

In a step 201 it is provided that the vehicle drives from one end of an assembly line of the manufacturing system to a parking facility of the manufacturing system and parks itself there according to a step 203, e.g., in a parking position.

This therefore means that the vehicle drives autonomously or remotely controlled to a parking position in a parking facility after its completion.

This advantageously allows for an autonomous driving functionality or a remote-control functionality of the vehicle to be tested. A parking functionality of the vehicle may thereby in particular be tested. The vehicle is, for example, an AVP vehicle.

Figure 3:
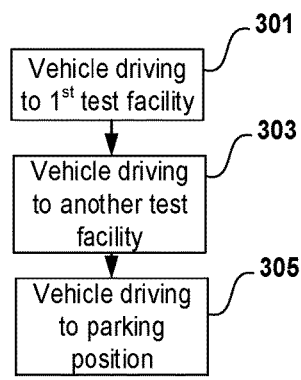
FIG. 3 shows a flow chart of another method for operating a vehicle.

FIG. 3 shows a flow chart of another method for operating a vehicle.

According to a step 301 it is provided that the vehicle drives within the manufacturing system to a first test facility during its driving operation. One or multiple test(s) may be carried out there. In a step 303, it is then provided that the vehicle drives to another test facility where one or multiple test(s) is/are also carried out on the vehicle. According to a step 305, it is subsequently provided that the vehicle drives to a parking position in a parking facility of the manufacturing system.

In one specific embodiment (not shown), it is provided that the vehicle drives to more than two test facilities.

Figure 4:
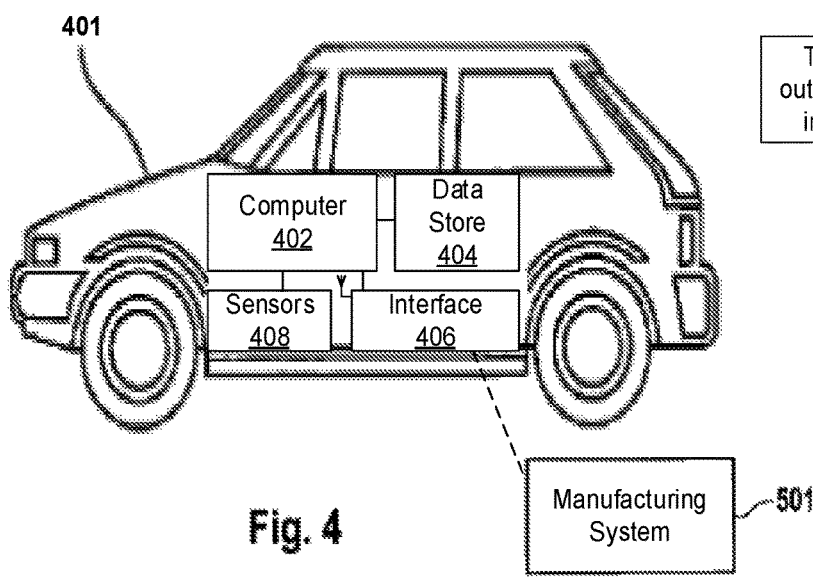
FIG. 4 shows a vehicle in communication with a manufacturing system.

FIG. 4 shows a vehicle 401 which is configured to carry out the method for operating a vehicle. The vehicle includes an interface 406 via which the vehicle 401 is in communication with a manufacturing system 501 for manufacturing vehicles, e.g., a vehicle according to vehicle 401 of FIG. 4, manufacturing system 501 being configured to carry out a method for operating a manufacturing system for manufacturing vehicles. The vehicle 401 carries out the method for operating a vehicle with the aid of the manufacturing system 501 within the scope of its manufacture. The vehicle 401 includes a computer 402 to process the instructions from the manufacturing system 501, e.g., to autonomously drive to a parking position instructed by the manufacturing system 501 via the interface 406. During the autonomous drive, the computer 402 stores in a data store 404 vehicle-internal data regarding the autonomous drive, which is obtained by sensors 408 of a monitoring system and which is then subject to inspection for determining the functioning of the vehicle in its autonomous driving.

This therefore means in particular that within the scope of its manufacture the vehicle drives autonomously within the parking facility or drives remotely controlled within the manufacturing system.

In summary, the present invention in particular and, inter alia, provides a technical concept in which a valet parking functionality, i.e., an automatic parking functionality, may be used for supporting the production or manufacturing process in the course of the production at a manufacturer (also referred to as OEM, OEM standing for original equipment manufacturer). In this way, it is advantageously possible to test and/or validate in parallel this valet parking functionality in addition to the completion of manufacture.

According to the present invention, at the end of the production process the AVP vehicle drives autonomously or remotely controlled from the conveyor belt, i.e., in particular at the end of the assembly line, to the OEM parking facility for produced vehicles, i.e., a parking facility outside of production.

In this way, the vehicle or the valet parking function or functionality is advantageously tested and/or validated at the same time with regard to its function. This means that the production or the plant, i.e., the manufacturing system for the AVP functionality in general, becomes a parking facility, in particular a parking deck. In this application, the manufacturer or OEM becomes a parking facility management system, for example. This therefore means that the manufacturing system takes over the functionality of a parking facility management system with regard to the AVP functionality.

A difference from conventional valet parking is in particular to be seen in that the vehicle remains in the parking facility after parking there, i.e., in particular after parking in the parking position, and does not drive back to a pick-up position at which the driver may pick up his/her vehicle within the scope of valet parking.

Another difference is in particular to be seen in that a parallel testing and/or validating is possible and/or is carried out according to the present invention.

The driving operation is preferably monitored and documented by a monitoring system in the process.

The vehicle-internal data are preferably also monitored and documented.

In another specific embodiment, it is provided that one or multiple test(s) and/or validation action(s) available on the way, i.e., from the end of the assembly line to the parking facility, take(s) place or are carried out.

According to one specific embodiment, it is provided that certain stops for additional actions are made on the way from the end of the conveyor belt, i.e., from the end of the assembly line to the parking facility; this means that the vehicle stops at one or multiple test facility(ies). For example, the tests may be selected randomly. One test may, for example, be a dent test or a paint test. Multiple tests are carried out in particular.

If it is possible that the AVP function or functionality is ready for operation already before a last production or manufacturing step, it is provided according to one specific embodiment that the AVP functionality is used already during the production or manufacture, e.g., so that the vehicle drives autonomously or remotely controlled from one production or manufacturing step A to another manufacturing step B.

Figure 5:
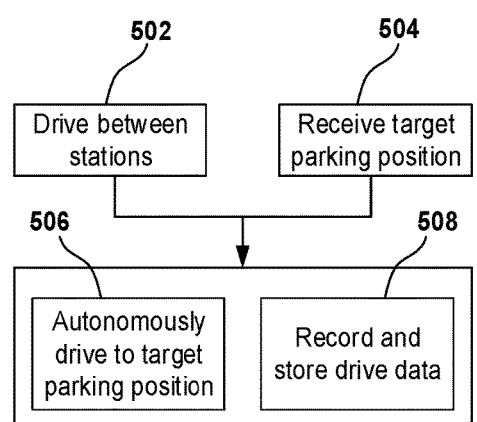
FIG. 5 shows a flow chart illustrating a method of a vehicle driving to a parking position from a manufacturing facility for testing autonomous operability of the vehicle.
Figure 5:
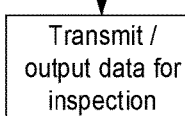

Thus, according to an example embodiment of the present invention, referring to FIG. 5, at step 502, the vehicle drives between stations. Additionally, at step 504, the vehicle receives a target parking position from an external system, such as the manufacturing system. At steps 506 and 508, the vehicle autonomously drives from a last one of the assembly stations to the parking position instructed by the external system and records vehicle-internal data about the vehicle's drive during its autonomous driving to the target parking position. At step 510, the vehicle outputs or transmits the stored data so that it can be analyzed to determine whether the vehicle properly functioned in its autonomous driving.

What is claimed is:

1. A method by a vehicle, comprising:
   the vehicle driving between a plurality of manufacturing stations within a vehicle manufacturing facility;
   receiving, by a computer of the vehicle, via an interface, and from an external system of the manufacturing facility, an identification of one of a plurality of parking positions of a parking facility;
   subsequent to the driving between the plurality of manufacturing stations, the computer of the vehicle autonomously driving from one of the plurality of manufacturing stations to the identified one of the plurality of parking positions; and
   the vehicle recording and storing vehicle data regarding how the vehicle operated during the driving to the identified one of the plurality of parking positions, the stored data being inspectable to determine whether the vehicle's autonomous driving functionality has been correctly implemented by the vehicle.

2. The method as recited in claim 1, wherein the manufacturing stations form an assembly line for vehicle manufacturing.

3. The method as recited in claim 1, wherein the autonomous driving by the vehicle to the identified one of the plurality of parking positions is monitored by a vehicle-external visual monitoring system for the determination of whether the vehicle's autonomous driving functionality has been correctly implemented by the vehicle.

4. The method as recited in claim 1, wherein the vehicle orients itself toward a vehicle-external navigation infrastructure during its driving operation.

5. A non-transitory computer-readable storage medium storing a computer program including program code that is executable by a computer of a vehicle, and that, when executed by the computer of the vehicle, causes the computer to perform a method, the method comprising:
   controlling the vehicle to drive between a plurality of manufacturing stations within a manufacturing facility;
   receiving, via an interface and from an external system of the manufacturing facility, an identification of one of a plurality of parking positions of a parking facility;
   subsequent to the driving between the plurality of manufacturing stations, controlling the vehicle to autonomously drive from one of the plurality of manufacturing stations to the identified one of the plurality of parking positions; and recording and storing vehicle data regarding operation by the vehicle during the drive to the identified one of the plurality of parking positions, the stored data being inspectable to determine whether the vehicle's autonomous driving functionality has been correctly implemented by the vehicle.

6. A vehicle comprising:

a computer;

a data store; and an interface;

wherein the computer is configured to:

control the vehicle to drive between a plurality of manufacturing stations within a vehicle manufacturing facility;

receive, via the interface, and from an external system of the manufacturing facility, an identification of one of a plurality of parking positions of a parking facility;

subsequent to the driving between the plurality of manufacturing stations, control the vehicle to autonomously drive from one of the plurality of manufacturing stations to the identified one of the plurality of parking positions; and record and store vehicle data regarding operation by the vehicle during the drive to the identified one of the plurality of parking positions, the stored data being inspectable to determine whether the vehicle's autonomous driving functionality has been correctly implemented by the vehicle.

\* \* \* \* \*